(12) United States Patent
Kenig

(10) Patent No.: US 10,697,814 B1
(45) Date of Patent: Jun. 30, 2020

(54) WATER METER PIT USING A BUOY TO ASSIST IN RF COMMUNICATION

(71) Applicant: Yoram Kenig, North Wales, PA (US)

(72) Inventor: Yoram Kenig, North Wales, PA (US)

(*) Notice: Subject to any disclaimer, the term of this patent is extended or adjusted under 35 U.S.C. 154(b) by 0 days.

(21) Appl. No.: 16/242,384

(22) Filed: Jan. 8, 2019

(51) Int. Cl.
*G01F 15/06* (2006.01)
*G01D 4/00* (2006.01)
*G08C 17/02* (2006.01)
*G01F 23/00* (2006.01)

(52) U.S. Cl.
CPC ........... *G01F 15/063* (2013.01); *G01D 4/004* (2013.01); *G01D 4/008* (2013.01); *G01F 23/0038* (2013.01); *G08C 17/02* (2013.01)

(58) Field of Classification Search
CPC ... G01F 15/063; G01F 23/0038; G01D 4/008; G01D 4/004; G08C 17/02
See application file for complete search history.

(56) References Cited

U.S. PATENT DOCUMENTS

| 2005/0179263 A1* | 8/2005 | Johansen | E21B 33/0355 290/1 R |
| 2006/0226325 A1* | 10/2006 | Cook | G01F 15/063 248/316.8 |
| 2018/0356512 A1* | 12/2018 | Alkhabbaz | G01S 13/758 |

* cited by examiner

*Primary Examiner* — James J Yang
(74) *Attorney, Agent, or Firm* — Steven A. Nielsen; www.NielsenPatents.com

(57) ABSTRACT

A wireless pit meter (WPM) transmitter unit comprises a complete wireless system for reading and transmitting water meter data, wherein the water meter may be submersed in water. In order to lower installation costs and to improve system reliability, a buoy transmitter is used within a water meter vault such that varying levels of water do not degrade radio signal propagation. A wire may be attached to a submerged water meter sending data to a disclosed buoy. The buoy has an antenna to transmit data to the underside of a pit lid repeater PLR, the PLR having an underside within the water meter pit and a top side reaching the outside of the water pit lid. The top side of the PLR comprises a spiral antenna capable of transmitting or repeating the water meter data to a distant receiver with the receiver in communication with a billing system.

1 Claim, 3 Drawing Sheets

WATER METER PIT USING A BUOY TO ASSIST IN RF COMMUNICATION

CROSS-REFERENCE TO RELATED APPLICATIONS

Not Applicable

BACKGROUND OF THE INVENTION (1) Field of the Invention

The invention generally relates to remote utility meter reporting systems. More particularly, the invention relates to means and methods of creating high output transmission system that comports with changing water levels within a meter pit.

(2) Description of the Related Art

While the general idea of using a buoy to support an antenna in a marine environment is known, see U.S. published patent application US2010022755, the known prior art fails to solve the challenges of placing an analogous buoy within the confines of a water meter pit.

BRIEF SUMMARY OF THE INVENTION

The present invention overcomes shortfalls in the related art by presenting an unobvious and unique combination and configuration of methods and components to construct a Wireless Pit Meter Transmitter Unit (WPM) to overcome the prior art challenge of wireless transmissions from water meter pits that are submersed in water.

In a disclosed embodiment, a water meter is disposed within a water meter pit wherein the water meter measures and reports the movement of water passing through the meter. Reading from the water meter are transmitted to an antenna disposed upon a floating buoy. The buoy may have a wire or other means of connection to the water meter. Electronic signals are passed from the water meter to the buoy. As the buoy floats upon the water within the meter pit, the buoy transmits water meter signals to pit lid repeater (PLR). The PLR in turn transmits the water meter signal to a receiver wherein the receiver may take many forms, such as gateway, a communications tower or other means of connection with the connection eventually leading to a billing facility or other relevant destination related to water delivery.

The invention overcomes shortfalls in the related art by providing artful means of sending a radio signal out of a subterranean water meter pit with the water meter pit containing every changing amounts of water. The artful use of a buoy, the buoy having an antenna to transmit to the PLR overcomes the problem of having a wireless transmission with in a water meter pit, wherein the water meter pit if full of water, severely restricting wireless transmission.

In the prior art, pit lid radio units may be disposed at the top of a water meter and use a cable and connector to the submerged water meter. A problem with the prior art is that RF or radio frequency propagation is very limited once the water meter is totally immersed in water. The presently disclosed embodiments overcome shortfalls in the prior art by eschewing internal cables and connectors, thus saving construction costs. The disclosed embodiments overcome shortfalls in the related art by decreasing installation time and by increasing system reliability. Tests have shown that the disclosed embodiments are up to ten times more reliably as compared to the prior art solutions.

Disclosed embodiments are sometimes called or may be referred to as WPM or wireless pit meter transmitter unit. A disclosed embodiment or WPM may comprise a complete wireless water reading and water consumption reporting solution for water meters that are disposed within water meter pits, wherein the water meter pits may be totally submersed in water.

While radio wave propagation water and out of the water into the air is very limited in range, the disclosed embodiments or WPM solution overcome such shortfalls by using a buoy having an antenna, wherein the buoy floats on top of the water in the meter pit, thus enabling wireless communication all the way from the water meter onward to the lid repeater or PLR, with the lid repeater able to communicate with a radio network gateway system. Thus, the disclosed embodiments In general, disclosed embodiments include meter reading systems that wirelessly transmit data to repeaters or central receiving units. Transmitted meter readings may be used for billing purposes and/or investigation of utility breakages or other problems as the disclosed embodiments provide two way communication between a water meter and centralized system, wherein a municipal water district or other water provider may be the recipient of the transmitted water data.

Fixed radio networks or local radio systems may be spread about a water district or other relevant area such that a plurality of disclosed water meter transmission systems may be remotely read with the transmitted water meter information processed for billing and other purposes and use.

Disclosed embodiments or components of disclosed embodiments may be referred to as IWM or integrated water meter wherein a IWM may comprise an on board short range transceiver, such as one in the 246 GHz ISM band or other unlicensed bands or unregulated radio frequency bands.

Disclosed embodiments or components of disclosed embodiments may comprise buoy or other flotation device equipped with an antenna that is built in or otherwise disposed upon or within the buoy. A disclosed buoy with an antenna may be floating within the IWM or meter pit, thus enabling a reliable and economical short range communication between the IWM and the PLR or pit lid repeater.

Disclosed embodiments or components of disclosed embodiments may comprise pit lid repeater or PLR which may communicate by radio waves over to and from a network gateway, over relatively long distances of a few miles.

These and other objects and advantages will be made apparent when considering the following detailed specification when taken in conjunction with the drawings.

Figure 1:
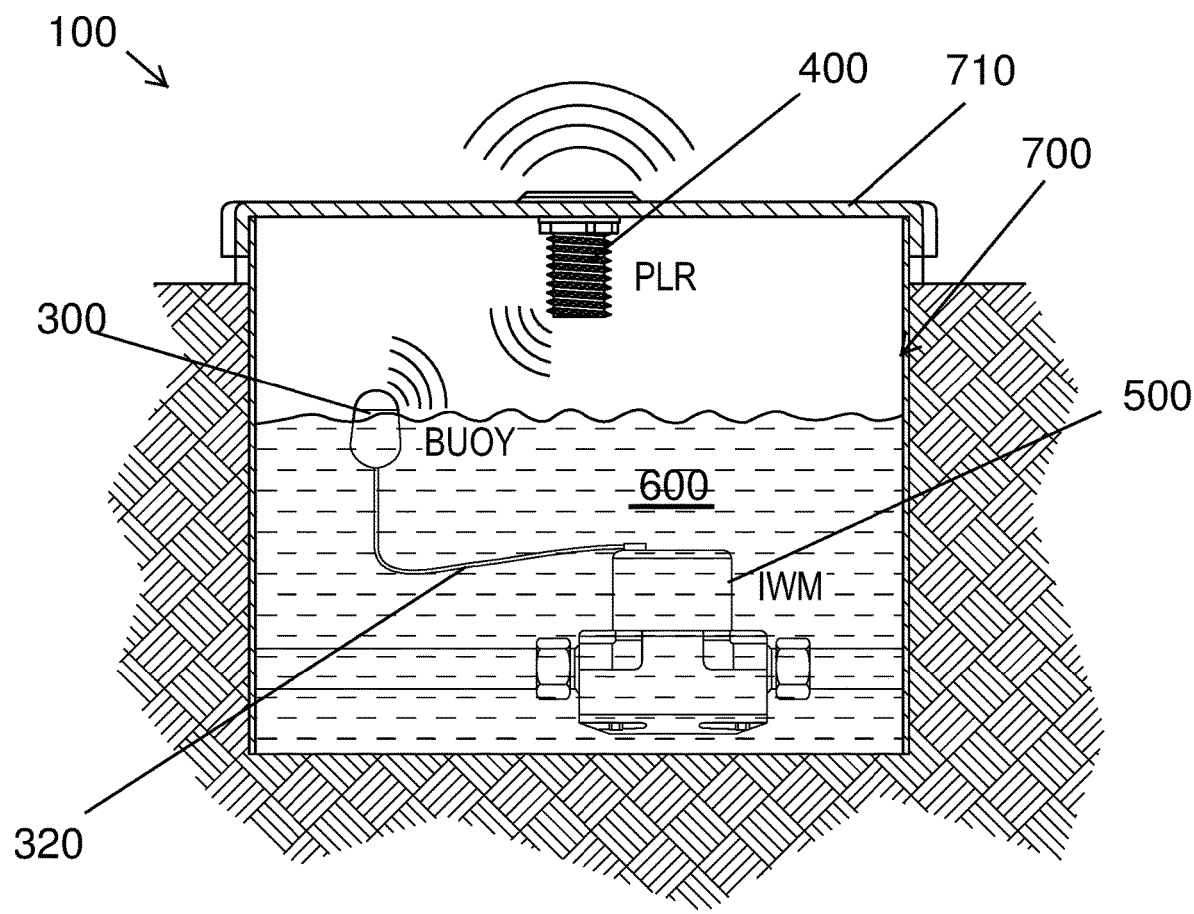
FIG. 1 depicts a schematic view of a disclosed embodiment

REFERENCE NUMERALS IN THE DRAWINGS 100 a disclosed system in general
200 network topology
210 server
220 billing computer
225 billing center 230 IP connection
235 IP cloud
240 home equipped with a disclosed embodiment
250 gateway
255 network gateway
260 communication tower
300 buoy with antenna
320 wire from water meter to buoy
230 IP connection
400 pit lid repeater or transmitter assembly or PLR
405 antenna cover
410 spiral antenna
415 antenna insulator
425 electronics board
427 battery pack of board for electronics 325
430 main housing
450 installation nut
500 IWM or integrated water meter
600 water
700 water meter vault
710 vault lid

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines FIG. 1 depicts a disclosed system 100 in general which may comprise a water meter or IWM 500 disposed within a water meter vault 700 with the water meter vault having a lid 710. Water 600 may be in the water meter vault covering the water meter or IWM. The water meter may measure water being sold to a house or business. The water meter may be submerged in water such as ground water. A flexible wire 320 may be attached to the water meter and to the buoy 300. The wire may communicate or transmit data from the water meter.

The buoy 300 has an antenna that uses radio waves or other means of wireless commination to transmit transmitting water meter data from the wire 320 to the pit lid repeater 400 or PLR. A pit lid repeater may be disposed both in the water meter vault and outside of the vault, with the out part comprising, see FIG. 3, an antenna cover 405, spiral antenna 410 and antenna insulator 415.

Figure 2:
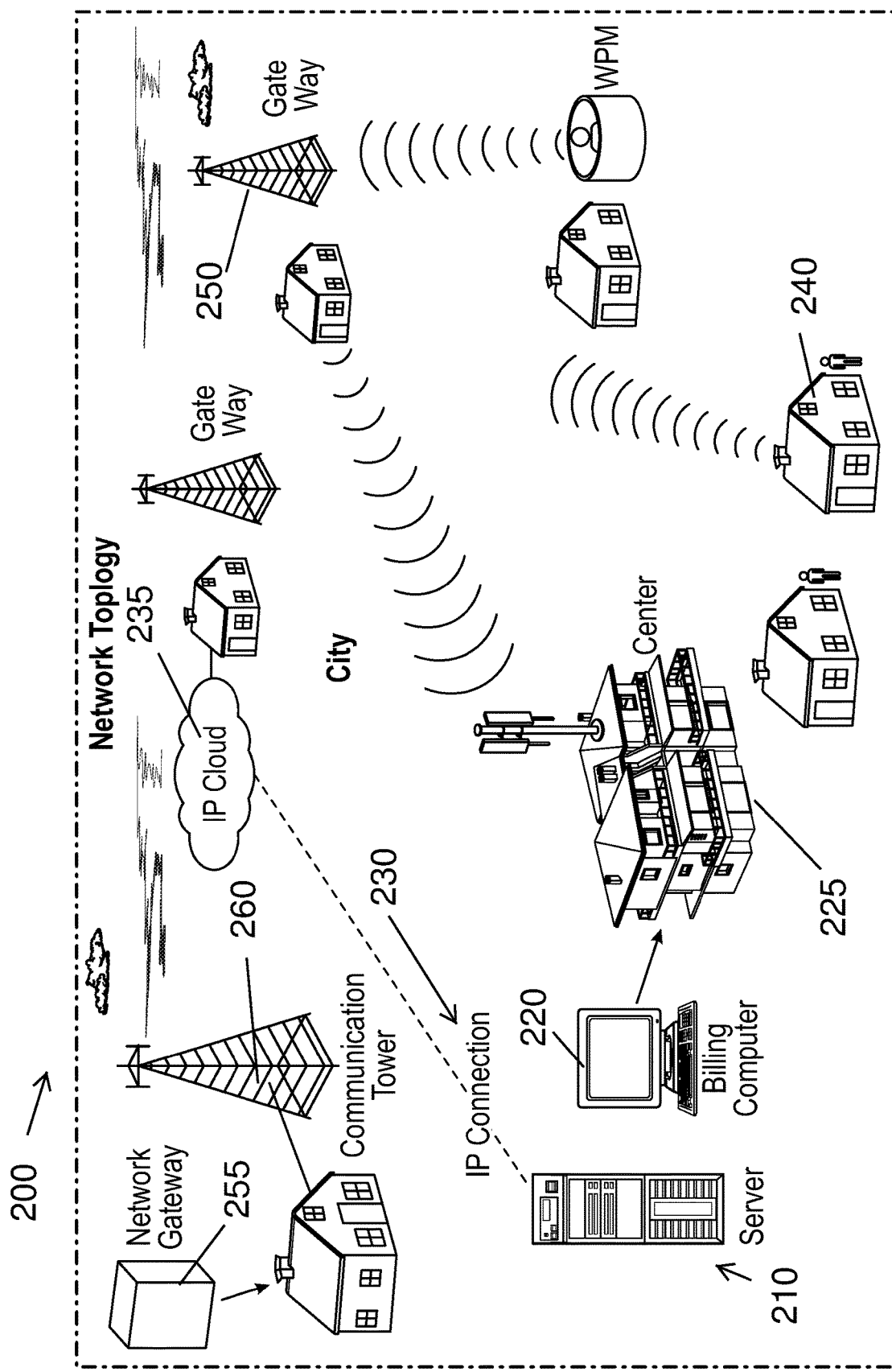
FIG. 2 depicts a network topology

Referring to FIG. 2, radio signals from the PLR 400 may be received, repeated and/or used with a network topology, such as the network topology 200 shown in FIG. 2. A network topology 200 may include a plurality of or a single server 210, billing computer 22, IP connection 230, home equipped with a disclosed embodiment 240, gateway 250, network gateway 255, communication tower 260, and other means of communication and data manipulation.

Figure 3:
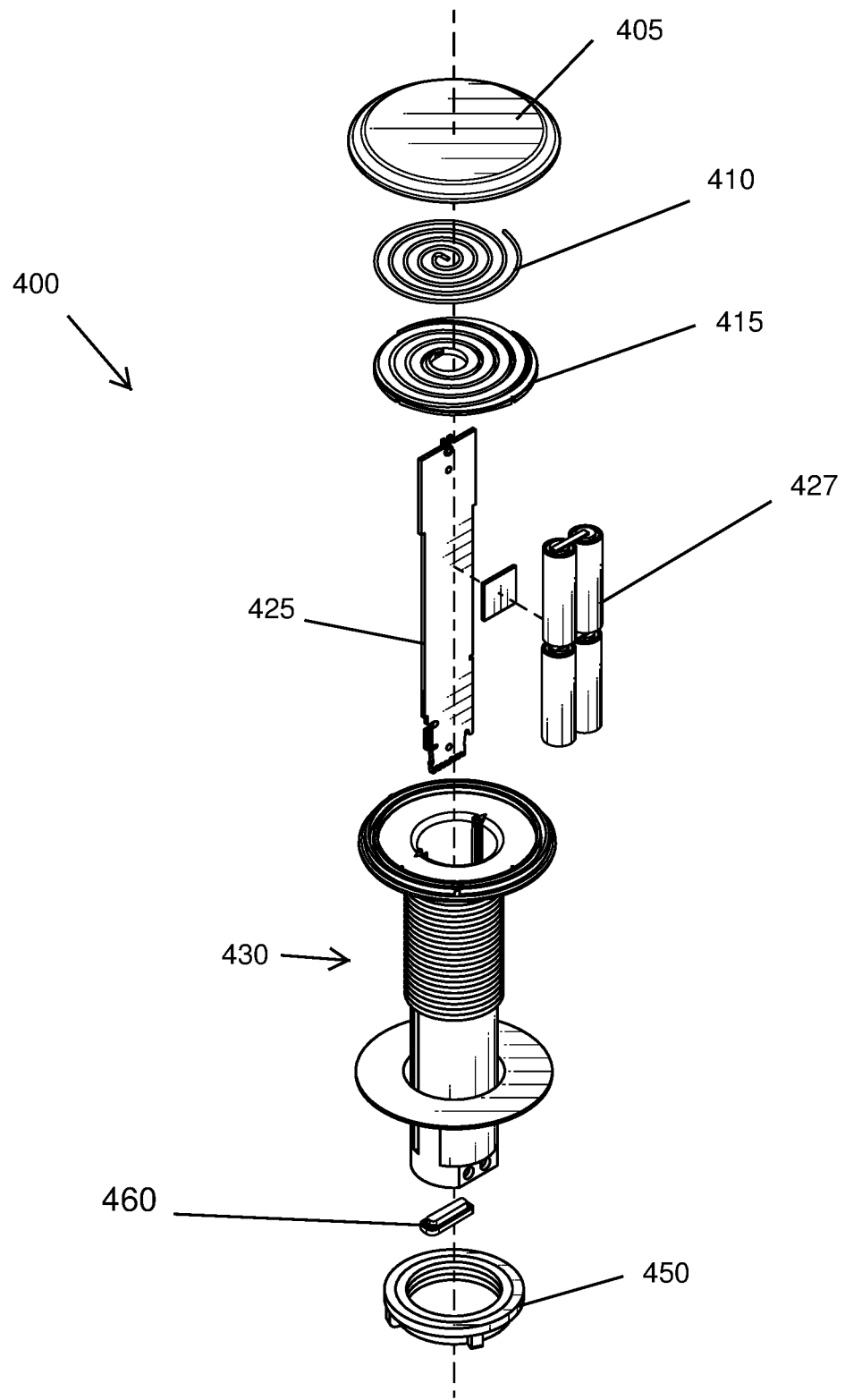
FIG. 3 depicts an exploded view of an antenna assembly

FIG. 3 depicts an exploded view of various pit lid repeater 400 or PLR components, including an integrated antenna cover 405, spiral antenna 410, and antenna insulator 315 with such components disposed on top of the lid 710 (See FIG. 1) of the water meter vault. Components disposed below the lid and in electronic connection with the spiral antenna may comprise a electronics board 425 disposed within a main housing 430 with the main housing secured by use of a installation nut 450. A lower antenna 460 may be disposed at a inferior or lower end of the PLR. The lower antenna 460 may accept wireless communication from the buoy and the lower antenna may be in electronic communication with the spiral antenna 410.

The disclosed embodiments may include the following items:

Item 1. A remote access water meter system 100 comprising:
a) a water meter 500 disposed in a water meter vault 700 with the water meter in electronic communication with a wire 320 and with the wire in electronic communication with a buoy 300, the buoy equipped with an antenna with the antenna in wireless communication with an inferior end of a pit lit repeater 400, with the inferior end of the pit lid repeater disposed within the water meter pit;
b) the pit lid repeater having a superior end disposed on a superior side of the water meter lid; and
c) the spiral antenna of the pit lid repeater in wireless communication with a remote receiver.

What is claimed is:
1. A remote access water meter system comprising:
a) a water meter disposed in a water meter vault with the water meter in electronic communication with a wire and with the wire in electronic communication with a buoy, the buoy equipped with an antenna with the antenna in wireless communication with an inferior end of a pit lid repeater, with the inferior end of the pit lid repeater disposed within the water meter vault;
b) the pit lid repeater having a superior end disposed outside the water meter vault on a superior side of a water meter lid of the water meter vault; and
c) a spiral antenna of the pit lid repeater in wireless communication with a remote receiver.

\* \* \* \* \*